United States Patent
Husband et al.

(10) Patent No.: US 10,107,134 B2
(45) Date of Patent: Oct. 23, 2018

(54) GEARED ARCHITECTURE TO PROTECT CRITICAL HARDWARE DURING FAN BLADE OUT

(71) Applicant: United Technologies Corporation, Hartford, CT (US)

(72) Inventors: Jason Husband, South Glastonbury, CT (US); Drew W. Lancaster, Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 435 days.

(21) Appl. No.: 14/773,924

(22) PCT Filed: Dec. 3, 2013

(86) PCT No.: PCT/US2013/072719
§ 371 (c)(1),
(2) Date: Sep. 9, 2015

(87) PCT Pub. No.: WO2014/163675
PCT Pub. Date: Oct. 9, 2014

(65) Prior Publication Data
US 2016/0017746 A1    Jan. 21, 2016

Related U.S. Application Data

(60) Provisional application No. 61/778,572, filed on Mar. 13, 2013.

(51) Int. Cl.
*F01D 21/00*    (2006.01)
*F01D 21/04*    (2006.01)
(Continued)

(52) U.S. Cl.
CPC ............. *F01D 21/006* (2013.01); *F01D 5/02* (2013.01); *F01D 15/12* (2013.01); *F01D 21/045* (2013.01);
(Continued)

(58) Field of Classification Search
CPC . F01D 21/00; F01D 15/12; F01D 5/02; F01D 1/006
See application file for complete search history.

(56) References Cited

U.S. PATENT DOCUMENTS

| 4,149,824 A | 4/1979 | Adamson |
| 6,203,273 B1 * | 3/2001 | Weiner .................. F01D 11/025 415/131 |

(Continued)

FOREIGN PATENT DOCUMENTS

| EP | 2535528 A2 | 12/2012 |
| FR | 2050550 A5 | 4/1971 |
| GB | 2226599 A | 7/1990 |

OTHER PUBLICATIONS

European Search Report for EP Application No. 13880744.1 dated Nov. 14, 2016.

(Continued)

*Primary Examiner* — Patrick Maines
(74) *Attorney, Agent, or Firm* — Carlson, Gaskey & Olds, P.C.

(57) ABSTRACT

A turbofan engine including a fan section including a plurality of fan blades rotatable about an axis, a compressor including a plurality of compressor blades, a turbine including a plurality of turbine blades and a geared architecture driven by the turbine for driving the fan section at a speed and direction different than the turbine is disclosed. A rub strip proximate at least one of the compressor blades, the turbine blades and the fan blades slows rotation when engaged. The rub strip generates a torque opposing rotation (Continued)

when in an engaged condition that is between 2 and 6 times a torque encountered in a non-engaged condition.

17 Claims, 3 Drawing Sheets

(51) Int. Cl.
    *F01D 5/02*     (2006.01)
    *F01D 15/12*     (2006.01)

(52) U.S. Cl.
    CPC .... *F05D 2220/323* (2013.01); *F05D 2220/36* (2013.01); *F05D 2260/40311* (2013.01); *F05D 2260/902* (2013.01); *Y02T 50/671* (2013.01)

(56) References Cited

U.S. PATENT DOCUMENTS

| | | | |
|---|---|---|---|
| 6,352,264 | B1 | 3/2002 | Dalzell, Jr. et al. |
| 7,448,843 | B2 | 11/2008 | Pilecki, Jr. |
| 8,020,875 | B2 | 9/2011 | Putnam et al. |
| 8,202,041 | B2 * | 6/2012 | Wojtyczka ............ F04D 29/023 415/119 |
| 8,297,917 | B1 | 10/2012 | McCune et al. |
| 9,194,299 | B2 * | 11/2015 | Alarcon ................ F01D 21/045 |
| 2005/0232755 | A1 | 10/2005 | Hugonic et al. |
| 2008/0022653 | A1 | 1/2008 | Schilling |
| 2010/0129227 | A1 | 5/2010 | Schilling et al. |
| 2010/0151985 | A1 | 6/2010 | Vetters et al. |
| 2011/0052383 | A1 | 3/2011 | Lussier |
| 2013/0064658 | A1 | 3/2013 | Rookstool |
| 2013/0156542 | A1 | 6/2013 | Suciu et al. |
| 2013/0195605 | A1 | 8/2013 | Robertson et al. |
| 2014/0205440 | A1 * | 7/2014 | Rao ......................... F01D 25/00 415/170.1 |
| 2016/0003084 | A1 * | 1/2016 | Husband ................ F01D 21/045 415/9 |

OTHER PUBLICATIONS

International Preliminary Report on Patentability for International Application No. PCT/US2013/072719 dated Sep. 24, 2015.
International Search Report and Written Opinion for International Application No. PCT/US2013/072719 dated Sep. 22, 2014.

* cited by examiner

GEARED ARCHITECTURE TO PROTECT CRITICAL HARDWARE DURING FAN BLADE OUT

REFERENCE TO RELATED APPLICATION

This application claims priority to U.S. Provisional Application No. 61/778,572 filed on Mar. 13, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Damage to one of the fan blades due to bird strikes or other debris entering the fan section are known as fan blade out events. A fan blade out event generates imbalances in the fan rotor hub that can cause further damage to the engine. Once a fan blade out event is detected, the engine is quickly shut down. The short duration of time in which the engine is shut down can exert high loads on all parts of the engine. The rate at which the engine is decelerated for a direct drive turbine engines is understood to be best when it occurs relatively slowly. In a direct drive turbine engine, the fan and the driving turbine rotate in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

A turbine engine including gear assembly between the turbine and the fan behaves differently than a direct drive engine during fan blade out events. Accordingly, it is desirable to develop and design features that compensate for fan blade out events in turbine engines including a speed reduction device.

SUMMARY

A turbofan engine according to an exemplary embodiment of this disclosure, among other possible things includes a fan, a compressor, a turbine including a plurality of turbine blades, a speed reduction device driven by the turbine for driving the fan at a speed and direction different than the turbine, and at least one rub strip proximate at least one of the compressor, the turbine and the fan for generating a force opposing rotation when in an engaged condition therewith that is between 2 and 6 times a torque encountered in a non-engaged condition for slowing rotation of at least one of the fan, compressor and turbine.

In a further embodiment of any of the foregoing turbofan engines, the fan includes a plurality of fan blades. The compressor includes a plurality of compressor blades and the turbine includes a plurality of turbine blades, and at least one of the fan blades, compressor blades and turbine blades engages the at least one rub strip for generating the force opposing rotation.

In a further embodiment of any of the foregoing turbofan engines, the engaged condition includes an imbalanced condition of at least one of the fan, the compressor and the turbine.

In a further embodiment of any of the foregoing turbofan engines, the rub strip is disposed proximate the compressor blades.

In a further embodiment of any of the foregoing turbofan engines, includes a shaft coupling the compressor and the turbine forming a low spool.

In a further embodiment of any of the foregoing turbofan engines, includes a flex support that grounds the speed reduction device to a static case structure and during operation the fan generates a fan torque and the low spool generates an input torque. The flex support grounds the fan torque and the input torque in the non-engaged condition.

In a further embodiment of any of the foregoing turbofan engines, the input torque and the fan torque are generated in a common direction when in the non-engaged condition and the flex support generates a grounding torque opposing the fan torque and the input torque.

In a further embodiment of any of the foregoing turbofan engines, the input torque opposes the fan torque in the engaged condition to reduce the grounding torque that the flex support encounters in the engaged condition.

In a further embodiment of any of the foregoing turbofan engines, the at least one rub strip includes a fan rub strip proximate the fan blade, a compressor rub strip proximate that compressor blades and a turbine rub strip proximate the turbine blades, and wherein in the engaged condition, the fan rub strip engages the fan blades, the compressor rub strip and the turbine rub strip engage corresponding turbine compressor blades and turbine blades to generate an input rub torque opposing a fan rub torque to reduce a rub torque encountered by the flex support.

In a further embodiment of any of the foregoing turbofan engines, the at least one rub strip provides a deceleration of rotating components of the turbofan engine and the rub strip is configured to define a desired rate of deceleration of the rotating components.

A method of controlling loads on a geared architecture during a fan blade out event according to an exemplary embodiment of this disclosure, among other possible things includes defining a rub resistance of rub strips proximate at least one of a compressor, fan and turbine for generating rub torques opposing rotation, configuring a fan rub strip proximate the fan for generating a fan rub torque during a fan blade out event, configuring rub strips proximate the compressor and the turbine for generating an input rub torque to a speed reduction device that is counter to the fan rub torque, and configuring a flex support to ground the speed reduction device to a static case structure to ground torque imbalance between the fan rub torque and the input torque.

In a further embodiment of any of the foregoing methods, includes the step of defining the rub resistance of each of the rub strips to reduce the torque imbalance between the fan rub torque and the input torque.

In a further embodiment of any of the foregoing methods, includes the step of defining the rub resistance of each of the rub strips to increase deceleration of the fan blades, compressor blades and turbine blades during a fan blade out event.

In a further embodiment of any of the foregoing methods, in a non-engaged condition none of the fan blades, compressor blades and turbine blades are in contact with the corresponding rub strips and an input torque to the geared architecture is in a direction common with a fan torque and the flex support generates a counteracting torque equal to the fan torque and the input torque.

In a further embodiment of any of the foregoing methods, in an engaged condition the fan blades and at least one of the compressor blades and turbine blades are in contact with corresponding rub strips and generate rub torques between 2 and 6 times greater than torques encountered during the non-engaged condition.

In a further embodiment of any of the foregoing methods, includes generating a rub torque between 2 and 6 times greater than torque generated in a compressor section with a rub strip proximate the compressor blades.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
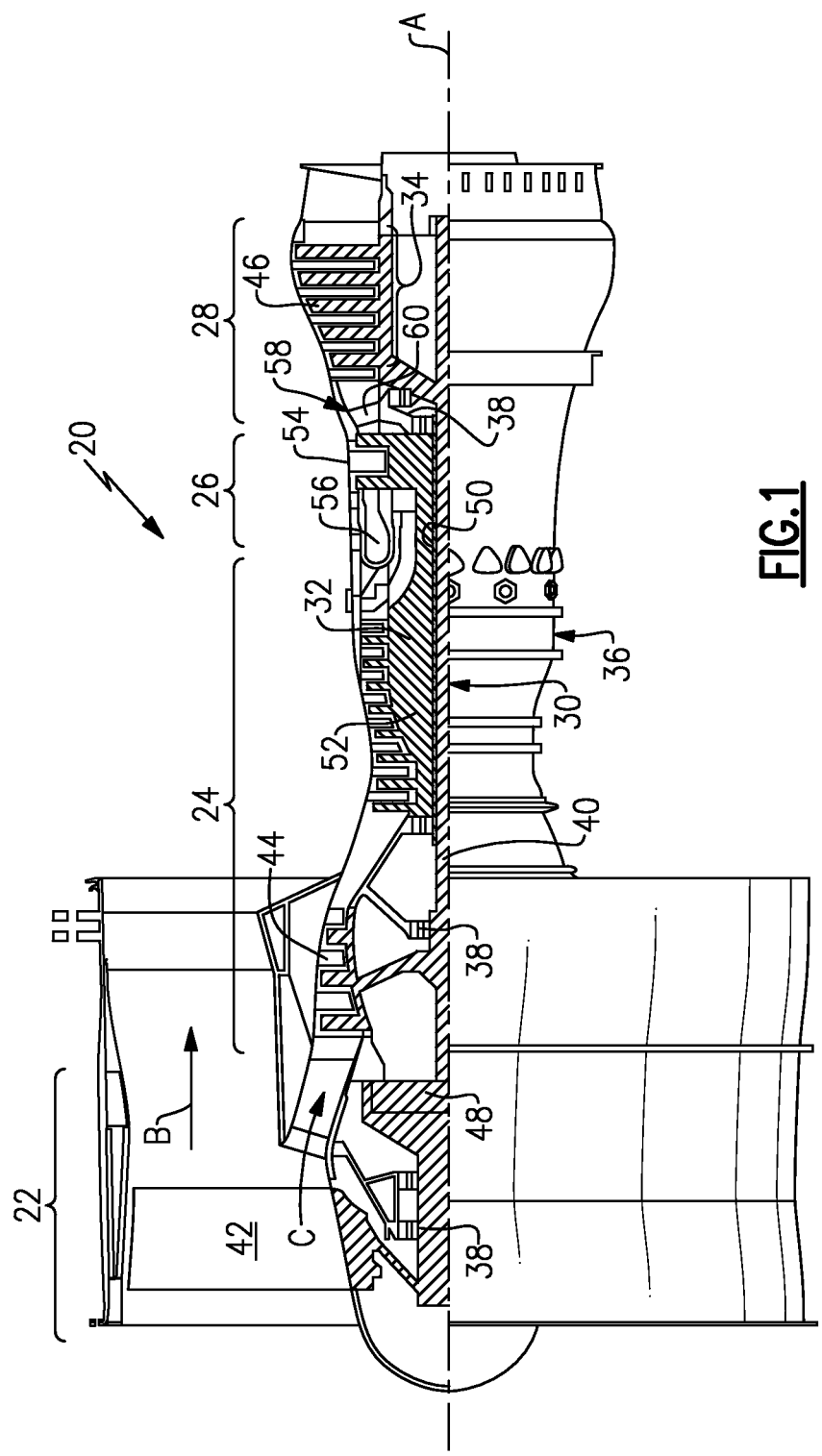
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular steady state flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point. An engine steady state condition may be at the cruise condition or any other condition where the engine is operating within desired operational parameters.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram } ° R)/(518.7° R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
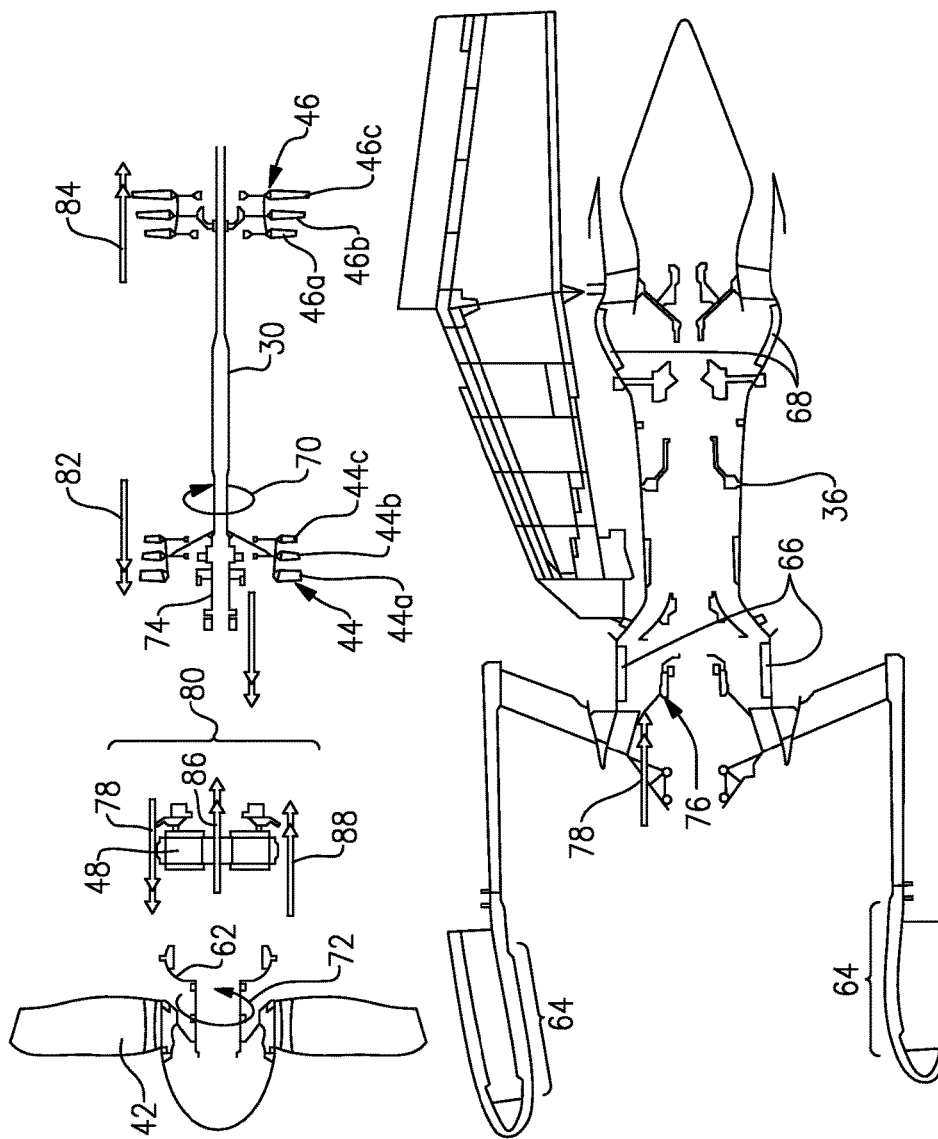
FIG. 2 is a schematic view of the example gas turbine engine in a steady state operating condition.

Referring to FIG. 2 with continued reference to FIG. 1, during typical steady state operation running torques on shaft 50, low pressure compressor 44 and low pressure turbine 46 are generated and transmitted through the geared architecture 48. In this example, the low pressure turbine 46 drives the geared architecture 48 through a flexible coupling shaft 74 driven by the low shaft 50. The low pressure compressor 44 includes compressor blades 44a-c and the low pressure turbine 46 includes turbine blades 46a-c.

The shaft 50 rotates in a first direction indicated at 70 and the fan hub 62 and fan blades 42 rotate in a second direction indicated at 72 that is opposite the first direction 70. The geared architecture 48 is supported and grounded to the static structure 36 through a flexible support 76. Any torque imbalance between the fan section 22 and the low spool 30 are transmitted through the flex support 76 to the engine static structure 36. Accordingly, the example flex support 76 includes a structure that enables transmission of such torque forces to the engine static structure 36 that may result during steady state operation and also during extreme unbalanced conditions such as are experienced during a fan blade out event.

Rub strips are provided proximate to the blade tips of the fan 42, compressor blades 44a-c and turbine blades 46a-c. The fan rub strip 64, compressor rub strip 66 and turbine rub strips 68 slow the fan 42, compressor 44 and turbine 46 respectively, during an imbalanced condition such as a fan blade out event. During a fan blade out event, the fan blades 42, compressor blades 44a-c and turbine blades 46a-c engage the corresponding rub strips 64, 66 and 68 to decelerate the low spool 30 and fan section 22 at a desired rate.

The deceleration rate at which the fan and thereby the engine is shut down in response to an unbalanced condition for a direct drive engine is typically desired to be as slow as possible to reduce the magnitude of forces on the static engine structures. In contrast, it has been determined that the opposing rotations provided by the fan section 22 and the low spool 30 benefit from a higher deceleration rate. Moreover, the counter-rotation of the fan 42 relative to the compressor 44 and turbine 46 generate torque forces that counteract each other to reduce loads directed through the flex support 76 to the engine static structure 36 during an engaged condition.

During steady state operation as is shown in FIG. 2, a turbine torque 84 and a compressor torque 82 counteract each other to produce a resulting input torque 86 on the geared architecture 48. The fan section 22 produces a fan torque 88 that is in the same direction as that of the input torque 86. Accordingly, the flex support torque 78 is configured to counteract both the fan torque 88 and the input torque 86 during steady state operation.

In one disclosed example, during steady state operation the fan torque 88 is 3X in/lbs where the X quantity is a fixed torque quantity. The steady state input torque is 1X in/lbs. Accordingly, because torque is a vector quantity the flex support 76 must provide a counteracting torque of −4X in/lbs. The corresponding torque balance on the geared architecture may therefore be indicated as 3:1:−4 with the first digit indicated the fan torque 88, the second digit indicating input torque 86 and the last digit indicating the reaction torque 78 required by the flex support 76 during a steady state, non-engaged condition.

Figure 3:
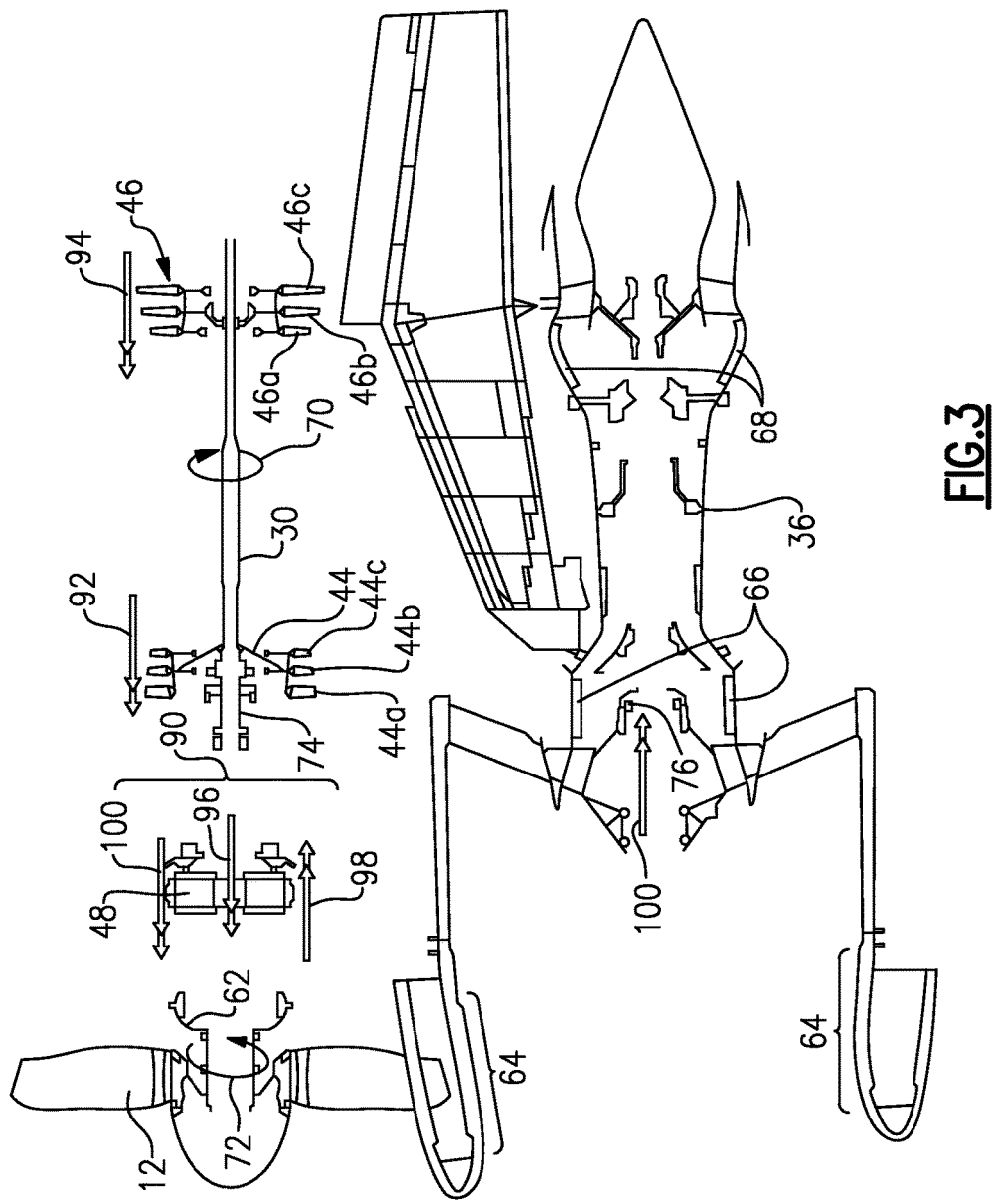
FIG. 3 is a schematic view of the example gas turbine engine during a fan blade out condition.

Referring to FIG. 3, with continued reference to FIG. 2, during an unbalanced condition such as a fan blade out event, the fan blades 42, compressor blades 44a-c and turbine blades 46a-c are in an engaged condition with corresponding rub strips 64, 66, 68 to decelerate the fan blades 42 and the low spool 30.

Torque forces on the fan section 22 and the low spool 30 increases dramatically during the engaged condition shown schematically in FIG. 3 and are typically 2-5 times higher than steady state torques indicated at 80 and schematically shown in FIG. 2. The rub torques schematically indicated at 90 includes a fan rub torque 98, and an input rub torque 96 and the counteracting flex support rub torque 100.

Engagement between the compressor blades 44a-c and the turbine blades 46a-c, result in compressor rub torque 92 and a turbine rub torque 94. Because both the turbine blades 46a-c and compressor blades 44a-c are decelerating due to contact with the corresponding rub strips 66, 68, the vector direction of both the compressor torque 92 and the turbine rub torque 94 are in a common direction. The common direction is the result of a direction change in the vector quantity of the turbine rub torque 94 compared to the turbine torque 84 in a steady state condition.

Accordingly, because both the compressor rub torque 92 and the turbine rub torque 94 combine in a common direction and no longer partially cancel each other as they do during steady state operation, the input rub torque 96 exerted on the geared architecture 48 also changes directions. That is, the input rub torque 96 changes directions such that it now opposite the fan rub torque 98. The opposite input rub torque 96 partially counteracts the fan rub torque 98 to reduce the overall torque imbalance on the geared architecture 48.

In one disclosed example, the torques 90 input to the geared architecture by the fan rub torque is approximately 12X in/lbs and input rub torque 96 is approximately −4X in/lbs. Accordingly, the flex support 76 is required to transmit a counteracting flex support rub torque 100 to the static structure 36 of approximately −8X in/lbs. The resulting torque balance may therefore be indicated as 12:−4:−8.

The input rub torque 96 direction changes direction and increases from 1 to 4 to partially counter the increase in fan rub torque and reduce the amount of torque required to be transmitted through the flex support 76.

The resulting decrease in torque forces exerted and transmitted through the geared architecture 48 protects the geared architecture 48 and the structures and conduits supporting operation. For example, numerous lubricant lines and conduits continuously rout high pressure lubricant to the geared architecture 48. Reduction of forces encountered during operation and fan blade out events reduces the structural loads, and thereby the structural requirements of the lubricant conduits and further protects features and structures that are susceptible to damage during the imbalanced conditions. Moreover, the reduced load enables a reduction in the size and weight of the static structures and flex support 76 supporting the geared architecture 48, The reduced torque loads 90 during unbalanced conditions are provided by controlling the deceleration rate of the low spool 30 and fan section 22. The deceleration rate and reduced torque loads 90 on the geared architecture 48 are provided by adjusting a resistance generated by the rub strips 64, 66, and 68. The resistance generated by the rub strips 64, 66 and 68 is adjusted by varying stiffness, material properties and depth.

In one example the resistance of the rub strips 64, 66 and 68 for the fan section 22, the compressor 44, and the turbine 46 are increased to control torque and oppose rotation when in the engaged condition. The rub resistance is increased to provide an increase in rub torques that is between 2 and 6 times greater than the steady state torques 80 encountered during steady state non-engaged conditions shown in FIG. 2.

The increased rub resistance in the rub strips 64, 66 and 68 protects the geared architecture 48 and over-torque of the flex support 76 during the fan blade out event. The increased resistance and opposition to rotation provided by the rub strips 64 provides an increased deceleration rate enabled by the reduction in torque rub forces 100 through the flex support 76 provided by opposing input rub torque 96 and fan rub torque 98.

In one example, the compressor rub strip 66 includes an increased rub resistance to provide the desired deceleration rates of the low spool 30. In another example, both the compressor rub strip 66 and the turbine rub strip 68 included an increased rub resistance. In still another example, the fan rub strip 64, the compressor rub strip 66 and the turbine rub strip 68 all include a rub resistance configured to provide a desired rate of deceleration. As appreciated, each of the rub strips 64, 66 and 68 can be adjusted to provide a rub resistance corresponding with the desired rub torque. Moreover, the torque balance is different for different engine configurations and therefore different rub resistance would be applicable to provide the desired protection and target rub torque range inputs.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbofan engine comprising:
a fan including a plurality of fan blades;
a compressor including a plurality of compressor blades;
a turbine including a plurality of turbine blades;
a geared architecture driven by the turbine for driving the fan at a speed and direction different than the turbine; and
at least one rub strip proximate at least one of the compressor, the turbine and the fan, wherein the at least one rub strip includes a resistance against rotation that generates a force opposing rotation when in an engaged condition with a corresponding one of the plurality compressor blades, the plurality of turbine blades and the plurality of fan blades, and the resistance generated by the at least one strip is between 2 and 6 times greater than a torque encountered in a non-engaged condition for slowing rotation of the fan, the compressor and the turbine.

2. The turbofan engine as recited in claim 1, wherein the engaged condition comprises an imbalanced condition of at least one of the fan, the compressor and the turbine.

3. The turbofan engine as recited in claim 2, wherein the rub strip is disposed proximate the compressor blades.

4. The turbofan engine as recited in claim 1, including a shaft coupling the compressor and the turbine forming a low spool.

5. The turbofan engine as recited in claim 4, including a flex support that supports grounds the geared architecture to a static case structure and during operation the fan generates a fan torque and the low spool generates an input torque, wherein the flex support transmits torque forces to the static case structure.

6. The turbofan engine as recited in claim 5, wherein the input torque and the fan torque are generated in a common direction when in the non-engaged condition and the flex support transmits the fan torque and input torque to the static case structure opposing the fan torque and the input torque.

7. The turbofan engine as recited in claim 5, wherein the at least one rub strip comprises a fan rub strip proximate the fan blade, a compressor rub strip proximate that compressor blades and a turbine rub strip proximate the turbine blades, and wherein in the engaged condition, the fan rub strip engages the fan blades, the compressor rub strip and the turbine rub strip engage corresponding compressor blades and turbine blades to generate an input rub torque opposing a fan rub torque to reduce a rub torque encountered by the flex support.

8. The turbofan engine as recited in claim 6, wherein the input torque opposes the fan torque in the engaged condition to reduce the torque that the flex support transmits to the static case structure in the engaged condition.

9. The turbofan engine as recited in claim 1, wherein the at least one rub strip provides a deceleration of rotating components of the turbofan engine and a stiffness of the rub strip defines a desired rate of deceleration of the rotating components.

10. A method of controlling loads on a geared architecture during a fan blade out event comprising:
determining a rub resistance of rub strips proximate at least one of a compressor, fan and turbine for generating rub torques opposing rotation at a determined deceleration rate;

assembling a fan rub strip proximate the fan for generating a fan rub torque during a fan blade out event;

assembling rub strips proximate the compressor and the turbine for generating an input rub torque to a geared architecture that is counter to the fan rub torque; and mounting a flex support between the geared architecture and a static case structure, the flex support transmitting input torque to a static case structure to counter torque imbalances between the fan rub torque and the input torque.

11. The method as recited in claim 10, including the step of determining a stiffness of the rub strips required to provide the rub resistance of each of the rub strips to reduce the torque imbalance between the fan rub torque and the input torque.

12. The method as recited in claim 10, including the step of determining a stiffness of the rub strips required to provide the rub resistance of each of the rub strips to increase deceleration of the fan blades, compressor blades and turbine blades during a fan blade out event.

13. The method as recited in claim 10, wherein in a non-engaged condition none of the fan blades, compressor blades and turbine blades are in contact with the corresponding rub strips and an input torque to the geared architecture is in a direction common with a fan torque and the flex support transmits a torque to the static case structure equal to the fan torque and the input torque.

14. The method as recited in claim 13, wherein in an engaged condition the fan blades and at least one of the compressor blades and turbine blades are in contact with corresponding rub strips and generate rub torques between 2 and 6 times greater than torques encountered during the non-engaged condition.

15. The method as recited in claim 13, including generating a rub torque between 2 and 6 times greater than torque generated in a compressor section with a rub strip proximate the compressor blades.

16. The turbofan engine as recited in claim 1, wherein the rub strip includes a stiffness that generates the resistance to rotation when in an engaged condition.

17. The turbofan engine as recited in claim 16, wherein the rub strip includes a depth and the depth generates the resistance to rotation when in an engaged condition.

\* \* \* \* \*

UNITED STATES PATENT AND TRADEMARK OFFICE
CERTIFICATE OF CORRECTION

PATENT NO. : 10,107,134 B2
APPLICATION NO. : 14/773924
DATED : October 23, 2018
INVENTOR(S) : Jason Husband and Drew W. Lancaster It is certified that error appears in the above-identified patent and that said Letters Patent is hereby corrected as shown below:

In the Claims

Claim 5, Column 8, Line 33; replace "supports grounds" with --supports and grounds--

Claim 10, Column 9, Line 7-8; replace "transmitting input" with --transmitting an input--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*